US 12,455,847 B2

United States Patent
Akra

(10) Patent No.: US 12,455,847 B2
(45) Date of Patent: Oct. 28, 2025

(54) MEASURING PROBE, IN PARTICULAR FOR THE TACTILE MEASUREMENT ON A SURFACE OF OBJECTS

(71) Applicant: Helmut Fischer GmbH Institut fuer Elektronik und Messtechnik, Sindelfingen (DE)

(72) Inventor: Bilal Akra, Friolzheim (DE)

(73) Assignee: HELMUT FISCHER GMBH INSTITUT FUER ELEKTRONIK UND MESSTECHNIK, Sindelfingen (DE)

( * ) Notice: Subject to any disclaimer, the term of this patent is extended or adjusted under 35 U.S.C. 154(b) by 110 days.

(21) Appl. No.: 18/039,140

(22) PCT Filed: Nov. 26, 2021

(86) PCT No.: PCT/EP2021/083087
§ 371 (c)(1),
(2) Date: May 26, 2023

(87) PCT Pub. No.: WO2022/112464
PCT Pub. Date: Jun. 2, 2022

(65) Prior Publication Data
US 2024/0004818 A1 Jan. 4, 2024

(30) Foreign Application Priority Data
Nov. 27, 2020 (DE) .................. 10 2020 131 476.0

(51) Int. Cl.
*G06F 13/38* (2006.01)
*G01B 5/06* (2006.01)
(Continued)

(52) U.S. Cl.
CPC .............. *G06F 13/385* (2013.01); *G01B 5/06* (2013.01); *G06F 13/4022* (2013.01); *G06F 13/4282* (2013.01); *G06F 2213/0042* (2013.01)

(58) Field of Classification Search
CPC ............ G01B 5/006; G06F 2213/0042; G06F 13/385; G06F 13/4022; G06F 13/4282
See application file for complete search history.

(56) References Cited

U.S. PATENT DOCUMENTS

2015/0043182 A1* 2/2015 Zhang .................. H05K 5/0086
361/753
2016/0188514 A1 6/2016 Forghani-Zadeh et al.
(Continued)

FOREIGN PATENT DOCUMENTS

CN 101937414 A 1/2011
CN 202694335 U 1/2013
(Continued)

OTHER PUBLICATIONS

Maxim. "USB 2.0 Full-Speed Transceiver with UART Multiplexing Mode" Internet Citation, Mar. 1, 2006, retrieved from the Internet: http://datasheets.maxim.ic.com/en/ds/MAX3349E.pdf (retrieved on May 9, 2007), XP002432696.
(Continued)

*Primary Examiner* — Henry Tsai
*Assistant Examiner* — Aurangzeb Hassan
(74) *Attorney, Agent, or Firm* — KRIEGSMAN & KRIEGSMAN

(57) ABSTRACT

Measuring probe, in particular for tactile measurement on a surface of objects, including a housing and a measuring head accommodated in the housing, wherein at least one communications interface is provided on the housing and communicates with a circuit arranged in the housing, the circuit including at least one microcontroller and at least one
(Continued)

Figure 1:
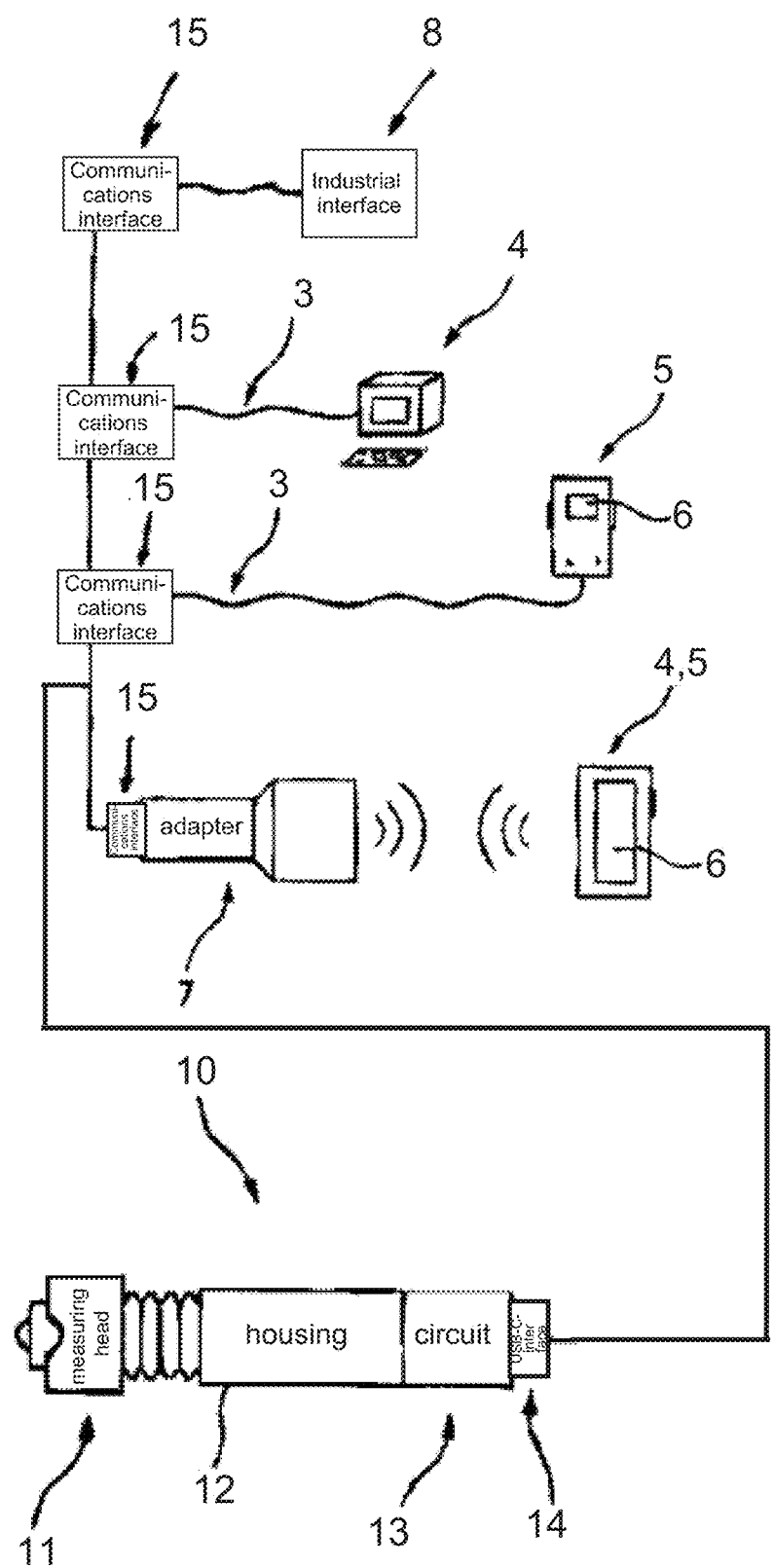

multiplexer, and at least two different communication protocols are transmittable by the circuit by way of a common communications interface.

17 Claims, 8 Drawing Sheets

(51) Int. Cl.
*G06F 13/40* (2006.01)
*G06F 13/42* (2006.01)

(56) References Cited

U.S. PATENT DOCUMENTS

| | | |
|---|---|---|
| 2017/0039153 A1 | 2/2017 | Chen et al. |
| 2019/0113541 A1* | 4/2019 | Bresser .................. G01R 13/02 |
| 2019/0235890 A1* | 8/2019 | Schnoor .............. G06F 13/4068 |
| 2021/0011841 A1* | 1/2021 | Balakrishnan ...... G06F 13/4282 |
| 2022/0146551 A1* | 5/2022 | Kunze ................ G01R 1/06788 |

FOREIGN PATENT DOCUMENTS

| | | |
|---|---|---|
| DE | 102010020116 A1 | 11/2011 |
| DE | 102011103123 A1 | 11/2012 |
| DE | 202015004127 U1 | 8/2015 |
| DE | 112018004603 T5 | 6/2020 |
| EP | 1806661 A1 | 7/2007 |
| EP | 2386822 A2 | 11/2011 |

OTHER PUBLICATIONS

International Preliminary Report on Patentability dated May 30, 2023, in PCT Application No. PCT/EP2021/083087.
International Search Report mailed Feb. 24, 2022, in PCT Application No. PCT/EP2021/083087 and English translation thereof.
Written Opinion mailed Feb. 24, 2022, in PCT Application No. PCT/EP2021/083087.

* cited by examiner

MEASURING PROBE, IN PARTICULAR FOR THE TACTILE MEASUREMENT ON A SURFACE OF OBJECTS

The invention relates to a measuring probe, in particular for tactile measurement on a surface of objects.

Measuring probes are widely used nowadays to test physical parameters, for example layer thicknesses, by means of specific sensor arrangements during or after a manufacturing process. For the detailed evaluation of data and/or to output measurement values recorded, the measurement data typically have to be transmitted from the measuring probe to data processing devices by means of a communication protocol. If a single communication standard is provided, the possibilities for transmission are limited.

Consequently, the potential applications for such a measuring probe are also limited. For example, mobile devices that are used to read the measurement data in the field often have different communication protocols to devices that are used in a manufacturing context. In the case mobile data processing devices, battery operation is also reduced as a result of high power consumption.

A measuring probe in which measurement data can be transmitted by means of a fixed connection line is known from DE 10 2011 103 123 A1. This permanently installed connection line results in data processing devices which cannot be used flexibly.

An audio device which has a communications interface is known from EP 1 806 661 A1. The communications interface is evaluated in respect of logical high/low states of two data contacts in order to determine the communication standard used by a connected external device. For this purpose, these data contacts are compared with reference voltages to determine whether there is a logical high or low at the respective data contact. Based on the result of this analysis, the communications interface can be configured in accordance with the USB and the UART communication protocol in order to be able to transmit audio files. However, determining the communication protocol therefore relies on a relatively complex evaluation since two contacts have to be analysed in respect of their voltage amplitudes and these also each have to be compared with reference values.

The invention sets out to provide a measuring probe, in particular for tactile measurement on a surface of objects, which allows flexible transmission of measurement data with lower power consumption.

The object is achieved according to the invention by the subject matter of the independent claim. Further advantageous embodiments and refinements are given in the dependent claims.

A measuring probe is provided which comprises a circuit comprising at least one microcontroller and at least one multiplexer which are connected to at least one communications interface. Data are transmittable by the circuit by means of at least two different communication protocols by way of the common communications interface. Because of the different communication protocols, there can be a balance between modular flexibility and low power consumption. As a result, for example, the measuring probe may be connected to mobile devices, PCs or the like via the communications interface and allow simple connection to industrial interfaces.

The communications interface is a USB-C interface. The USB-C interface widely known nowadays and is used in numerous different applications. In addition, the USB-C interface can be used not only according to the USB communication protocol, but also according to the UART communication protocol.

The communications interface has at least one first voltage contact and at least two data contacts. The multiplexer is coupled to the communications interface and the microcontroller. The multiplexer can be configured as a function of at least one first voltage amplitude present at the at least first voltage contact in accordance with at least one first communication protocol and one second communication protocol. In particular, the multiplexer can be configured as a function of at least the first voltage amplitude such that data are transmittable from the microcontroller to an external device by means of the at least two data contacts based on the configured communication protocol. This measuring probe makes it possible to simplify the detection mechanism of the communication protocol to be used.

The measuring probe may preferably further comprise at least one USB-to-serial converter. The multiplexer may then be able to be configured in accordance with at least the first and the second communication protocol either on the basis of the microcontroller alone or on the basis of the microcontroller and the USB-to-serial converter. In the first case, the microcontroller may be set up to provide data in accordance with two different communication protocols for the multiplexer. A USB-to-serial converter is then not required and can be dispensed with. In the second case, the microcontroller may be such that it enables data transmission only according to one communication protocol. The USB-to-serial converter may enable the data transmission according to the second communication protocol. For this purpose, the USB-to-serial converter can, in particular, be coupled to the microcontroller and the multiplexer. In this case, the microcontroller can transmit data to the USB-to-serial converter in accordance with the first communication protocol, where it can be converted such that it is present according to the second communication protocol. The data can then be transmitted from the USB-to-serial converter to the multiplexer in order finally to make it available for transmission using the communications interface in accordance with the second communication protocol. The advantage lies in the fact that the microcontroller can be configured more simply. The microcontroller only has to be in control of one communication protocol.

According to a preferred embodiment, the measuring probe may also comprise a low-dropout regulator. The low-dropout regulator may be coupled to the communications interface. The low-dropout regulator enables an input voltage received from the communications interface to be smoothed and an output voltage to be provided as a supply voltage for the microcontroller and/or the multiplexer. A low-dropout regulator may be understood, in particular, to be a linear regulator. A stable supply voltage may be of considerable significance for the functioning of the microcontroller and/or the multiplexer. A voltage provided at the communications interface of an external device may be used to actuate the multiplexer. If there is a voltage of, for example, 3.2 V to 4.3 V present, the microprocessor is addressed and the multiplexer continues to work with a first communication protocol (default), preferably with the UART communication protocol. If there is a voltage of more than 4.3 V, in particular of 5 V, present, the USB-to-serial converter is optionally additionally supplied with voltage and a switch is made to the second communication protocol, in particular the USB communication protocol.

Furthermore, provision is preferably made for the input voltage of the low-dropout regulator only to be able to be based on the voltage present at the first voltage contact of the communications interface. This not only means that the voltage present at the first voltage contact determines the communication protocol by means of which the data are transmittable by way of the communications interface, but that the same voltage is also used for supplying voltage to the microcontroller and/or the multiplexer. This may be made possible, for example, using a parallel circuit. Advantageously, no additional contacts of the communications interface are required in order to provide the supply voltage.

Alternatively, the communications interface may comprise at least one second voltage contact. The input voltage of the low-dropout regulator may then be based on the voltage present at the second voltage contact of the communications interface. As a result, the voltage underlying the supply voltage is separate from the voltage determining the communication protocol. This may lead to the voltage underlying the supply voltage being subject to less distortion from the outset. The demands that are placed on the low-dropout regulator may therefore be lower, so a simpler and less expensive component may be usable.

A further preferred embodiment provides for the fact that the microcontroller comprises at least one voltmeter or is coupled to such a voltmeter. It may then be possible to determine a value of the first voltage amplitude present at the at least first voltage contact. The corresponding measurement value of the voltage amplitude may then be used by the microcontroller in order to determine the communication protocol on the basis of which the data transmission is supposed to be configured.

More preferably, the measuring probe may comprise a voltage divider. An input of the voltage divider may be electrically coupled to the at least first voltage contact. The voltmeter may then have applied to it a voltage output from the voltage divider. This embodiment is particularly advantageous if the voltage present at the first voltage contact of the communications interface is used both for determining the communication protocol and for supplying voltage to the microcontroller and/or the multiplexer. The voltage divider may then be arranged in a parallel circuit. The voltage divider represents an efficient option for providing a corresponding test voltage which depends directly on the voltage of the first voltage contact.

According to a further preferred embodiment, the multiplexer may be configured in accordance with the first communication protocol unless the voltage amplitude present at the first voltage contact exceeds a first predetermined threshold. Should the threshold be exceeded, the multiplexer may then be configured in accordance with the second communication protocol. The threshold represents a very efficient way of distinguishing between the determining voltage amplitudes. This also means that a default state of the communication protocol to be used can be determined very efficiently on the basis of the threshold. This is because, if there is no voltage at all present at the first voltage contact, the threshold is not exceeded. Therefore, the first communication protocol represents the default state of the communication protocol to be used. Changing the configuration of the multiplexer may depend on a control signal to be provided. The control signal may, in particular, depend on whether the voltage amplitude present at the first voltage contact exceeds the predetermined threshold. As soon as this happens, the multiplexer can be configured by means of the control signal in accordance with the second communication protocol. If the voltage amplitude falls back below the threshold, the configuration of the multiplexer may change again so that it falls back again and is configured in accordance with the first communication protocol. With regard to the threshold, a hysteresis may be provided in order to prevent any rapid change between the states.

Provision is preferably made for the voltage amplitude present at the at least first voltage contact to be provided by an external device. As a result, it is advantageously guaranteed that the communication protocol to be used can be determined by the external device coupled to the communications interface. If one considers that only the voltage amplitude present at the first voltage contact determines the communication protocol to be used, this means that devices which require a data communication in accordance with the first and second communication protocol output a voltage at the same voltage contact of the communications interface. This enables the communication protocol that is to be used to be determined, that is to say in automated fashion. This is because, irrespective of the communication protocols by which the external device requests the data transmission, this can in any case be determined on the basis of the voltage present at the first voltage contact and provided by the external device.

According to a refinement of the measuring probe, the circuit may be configured such that a supply voltage for the circuit in the housing is provided exclusively via the first voltage contact, in particular from the external device. This means that the supply voltage can be provided for all components in the circuit, that is to say the multiplexer, the microcontroller and, optionally, the low-dropout regulator and the serial-to-USB converter, exclusively from the first voltage contact. The circuit may then be of particularly low complexity.

A preferred embodiment also provides for the fact that the multiplexer is configured exclusively as a function of a voltage amplitude present at the first voltage contact. It is therefore possible to avoid having to evaluate voltage amplitudes of two voltage contacts in order to configure the multiplexer and, optionally, the microcontroller in accordance with the desired communication protocol.

In particular, to evaluate the voltage amplitude present at the first voltage contact, a voltmeter can be coupled thereto. The voltmeter is then external to the microcontroller. The evaluation of a plurality of voltage amplitudes which are present at a plurality of different voltage contacts would require a more complex circuit in the housing. For example, a plurality of voltmeters would then be required. However, this would not only lead to greater complexity of the circuit, but also to increased power consumption. Consequently, the maximum operating time of an energy storage device that is used to supply the circuit would be reduced. In particular, in the case of mobile applications of the measuring probe, an evaluation of a plurality of voltage contacts in respect of the voltage amplitude present in each case would lead to limited run times or operating periods.

A voltage amplitude present at the first voltage contact can be evaluated with the aid of a comparator, for example in respect of at least one threshold. The comparator may therefore be part of the voltmeter. This enables evaluation to be simplified. Since the multiplexer is only evaluated as a function of a voltage amplitude (which is present at the first voltage contact), additional comparators can be dispensed with, this enabling power consumption to be reduced and extending the running time as a function of a given storage capacity of an energy storage device.

The comparator can then evaluate the voltage amplitude present at the first voltage contact in respect of at least one threshold. An output signal of the comparator may specify whether the threshold has been undershot or exceeded. A hysteresis may be provided in order to prevent rapid changing. In particular, the multiplexer and, optionally, also the microcontroller may be configured as a function of the output signal of the voltmeter, in this case the comparator, according to either the first or the second communication protocol.

The first voltage contact may, in particular, be a VBUS1 contact of the communications interface, in particular of the USB-C interface. The VBUS1 contact is usually used in USB-C interfaces to provide a supply voltage. Here, the circuit of the measuring probe can therefore have applied to it a supply voltage according to the standard by means of the VBUS1 contact. However, the same contact can also be evaluated to identify the communication protocol required by the external device. According to the prior art, other pins of the USB-C interface, for example CC1 and CC2, are used for the interface configuration. However, this would make the circuit more complex. According to the prior art, a plurality of pins would also have to be evaluated in respect of the voltage amplitude present. That is not the case here. Only a single pin, the VBUS1 contact, provides both the supply voltage for the circuit of the measuring probe and, at the same time, the information for the communication protocol to be used (through the voltage amplitude present). Consequently, the complexity of the circuit is reduced and the operating period is increased.

In an optional embodiment, the voltmeter and the low-dropout regulator may be arranged in a parallel circuit with respect to the first voltage contact. As a result, the first voltage contact may be used particularly easily both for providing a supply voltage and for identifying the communication protocol required. The supply voltage is advantageously smoothed by the low-dropout regulator here, as a result of which the subsequently loaded components, for example the microcontroller, are subject to less distortion.

A further preferred embodiment provides for the fact that the first communication protocol is a UART communication protocol and the second communication protocol is a USB communication protocol. These communication protocols enable extensive ranges of application of the measuring probe. The UART communication protocol is typically used to carry out digital serial interface communication. The USB communication protocol represents a serial communication protocol. In particular, these communication protocols represent the main applications of mobile applications.

According to a preferred embodiment, the measuring probe may comprise a measuring head with a sensor arrangement for measuring layer thicknesses, corrosion protection, for material testing, for temperature testing or for surface testing. Measurement data of the sensor arrangement may then be communicable to an external device using at least the first communication protocol or the second communication protocol. Such measuring probes are used, for example, to test the thicknesses of layers of paint. This is often carried out outside manufacturing environments in the field, for example, in the case of an aircraft, on a runway. It is therefore particularly advantageous if the measurement data can be read, on the one hand, by special mobile handheld devices operated with batteries and, on the other, by, for example, conventional computers, tablets or similar devices that are also supplied with mains power or operated only when stationary. The various devices often use different communication protocols here, specifically the UART or the USB communication protocol. The present measuring probe therefore enables the corresponding measurement data to be provided for external evaluation in many different ways and for many applications. In particular, in the case of battery-operated applications, the required evaluation of just a single voltage contact of the communications interface is advantageous since it enables the device to have an extended run time.

Figure 2:
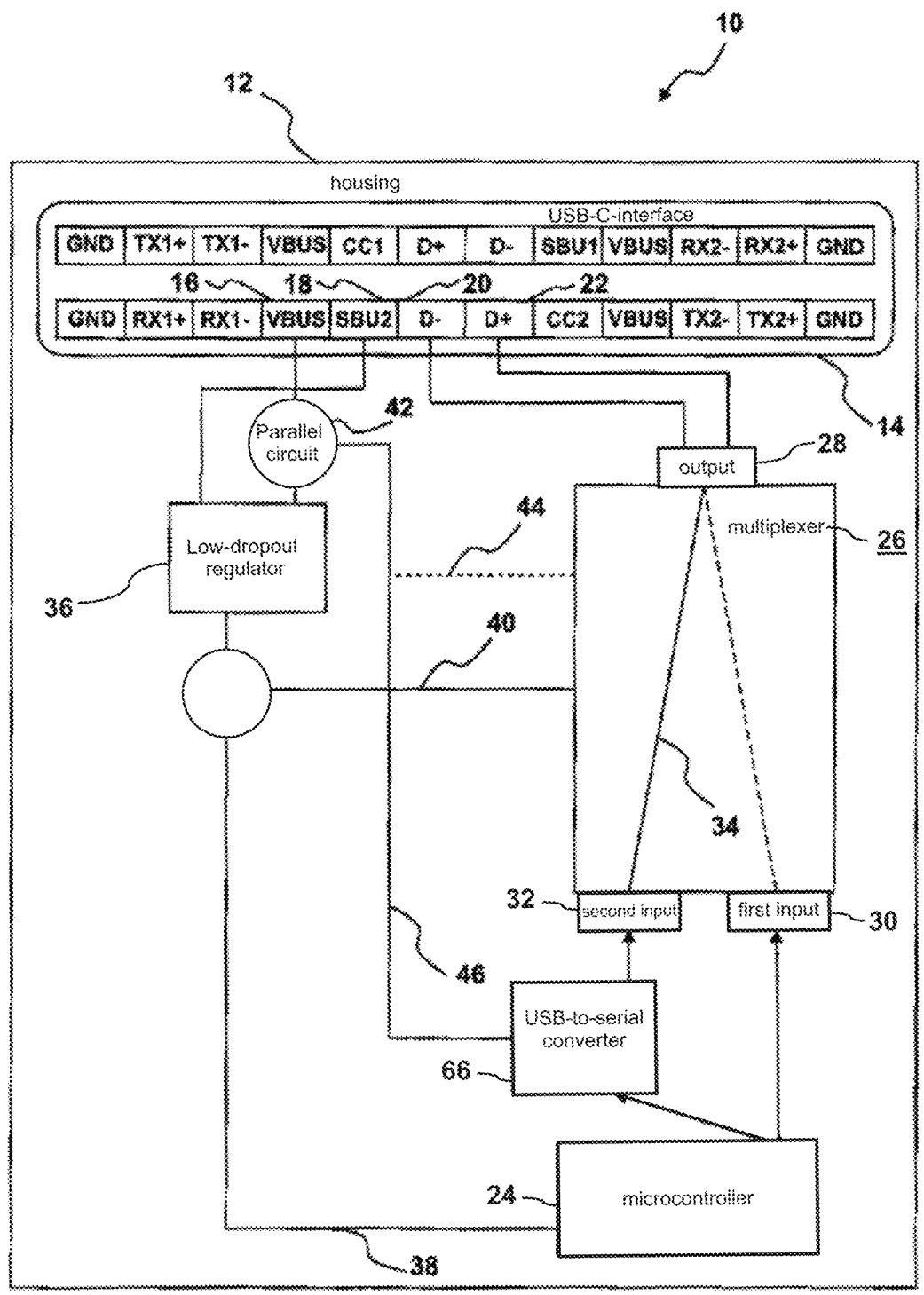
Figure 3:
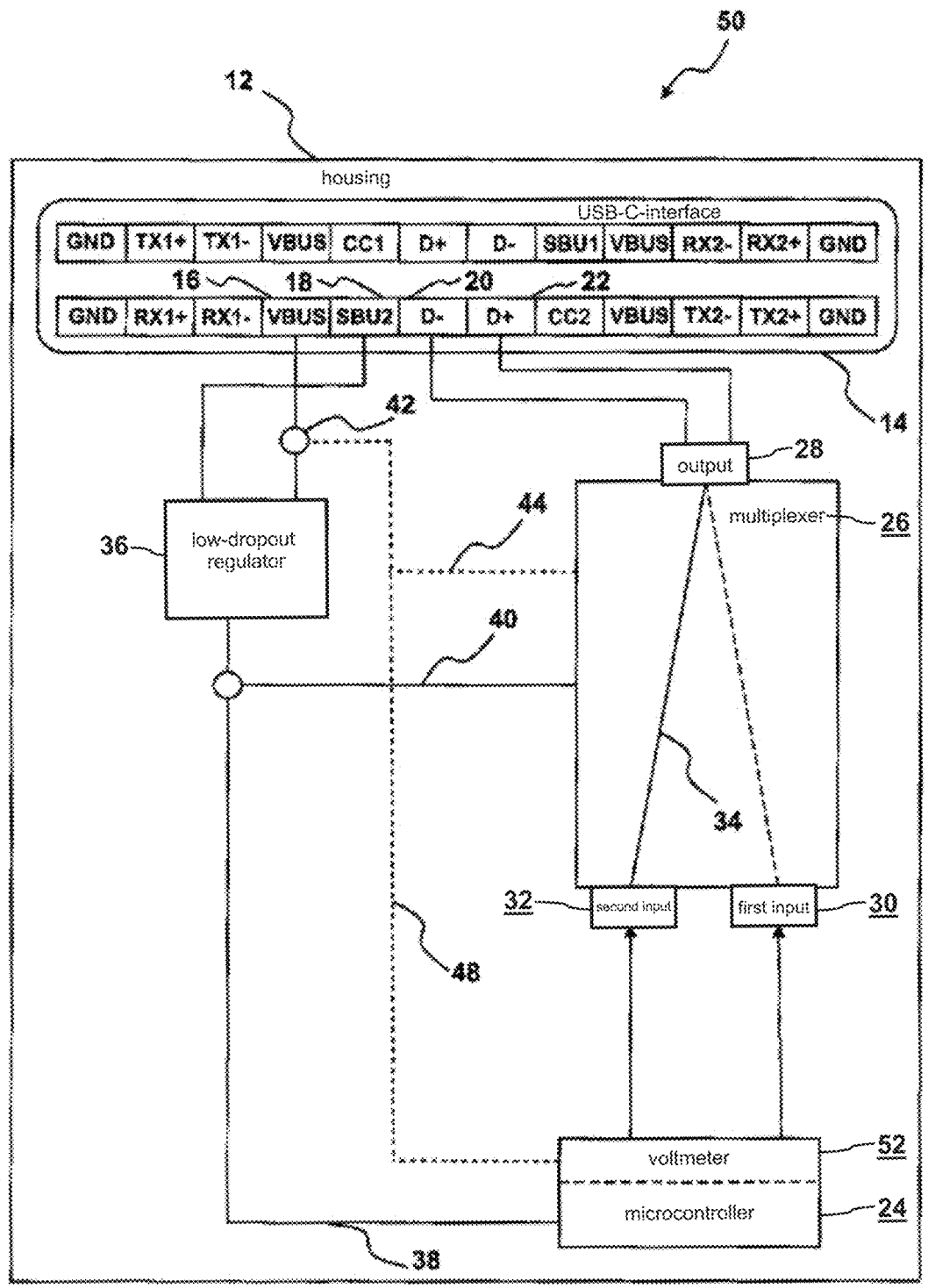
Figure 4:
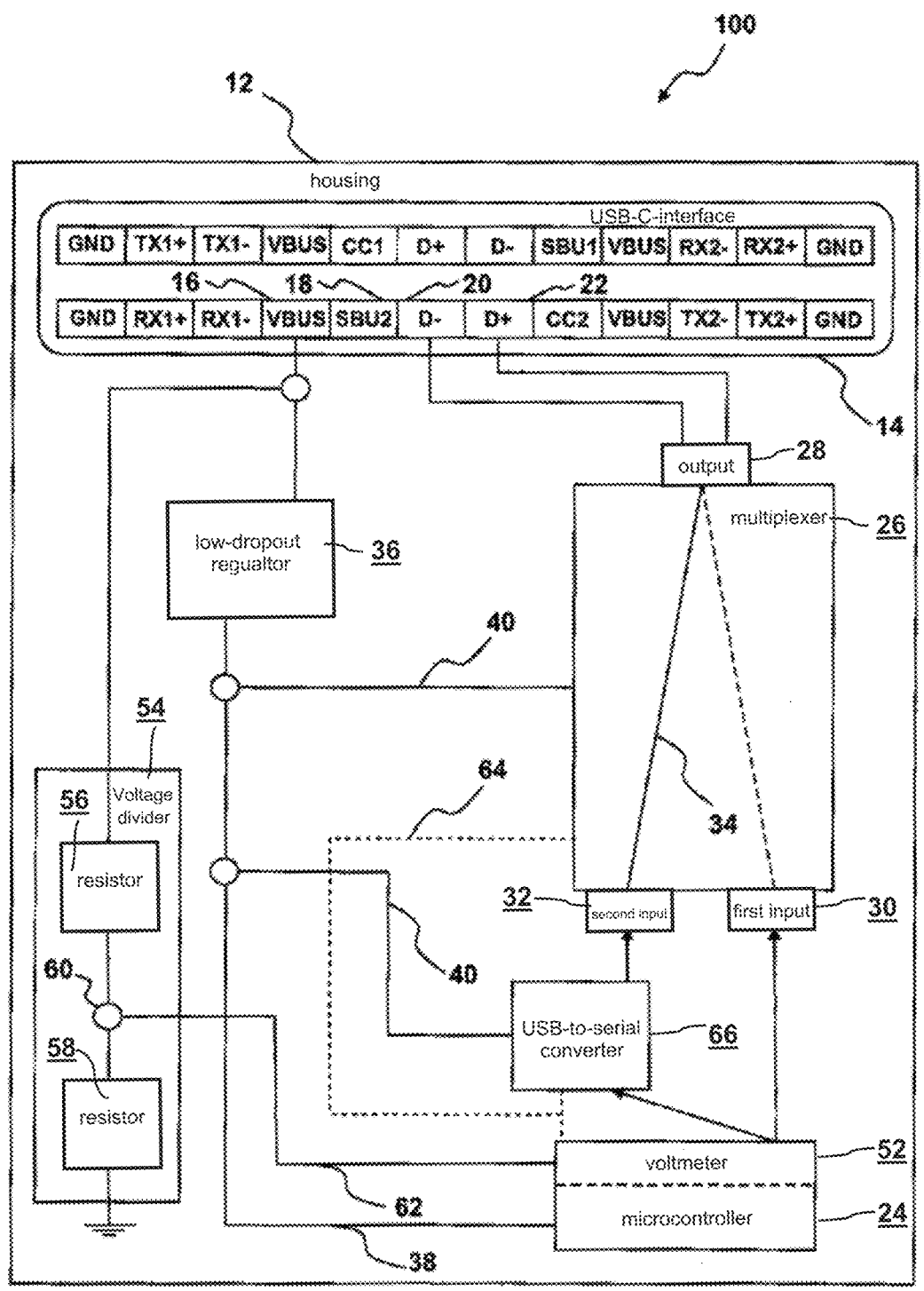
Figure 5:
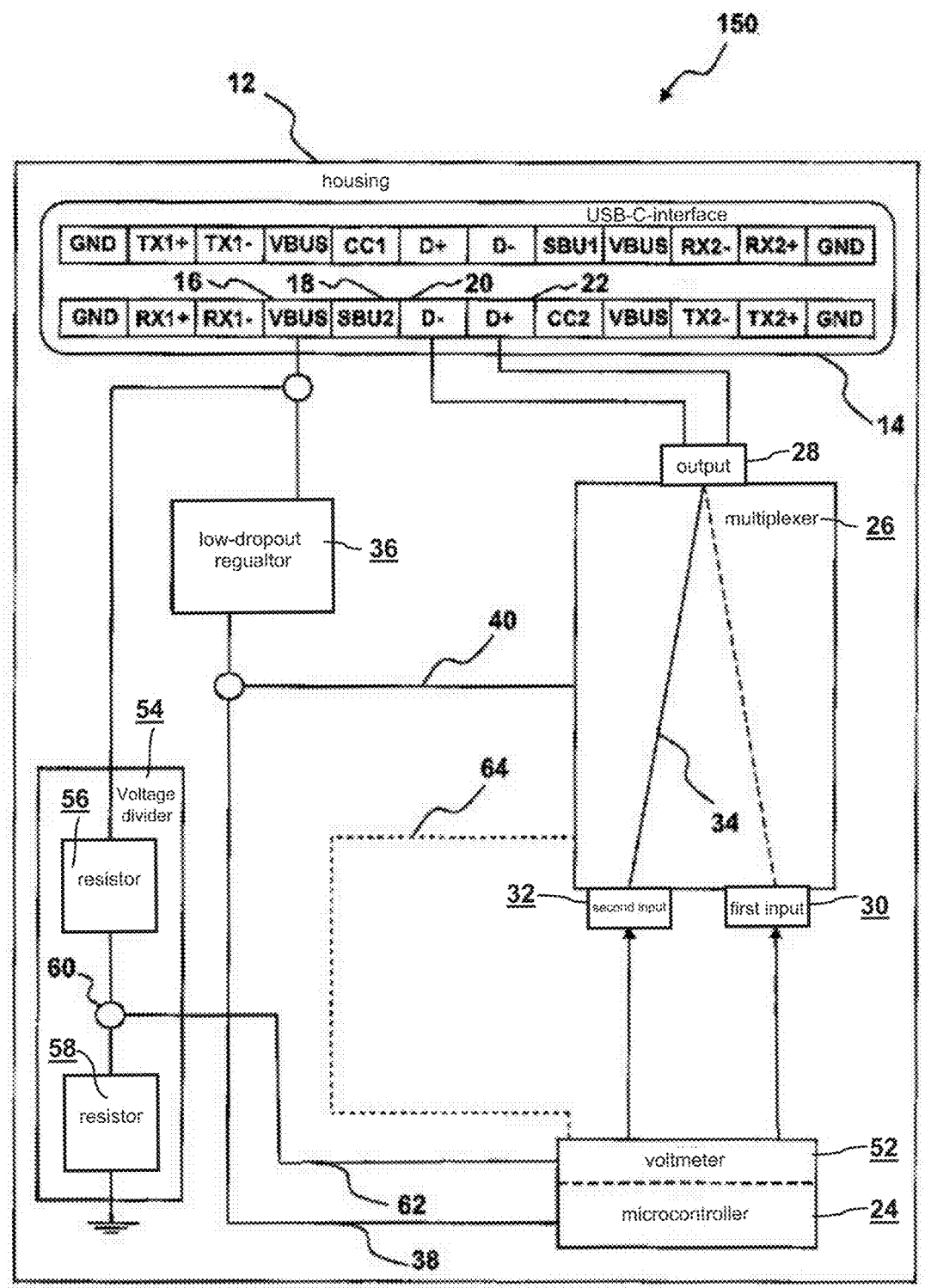
Figure 6:
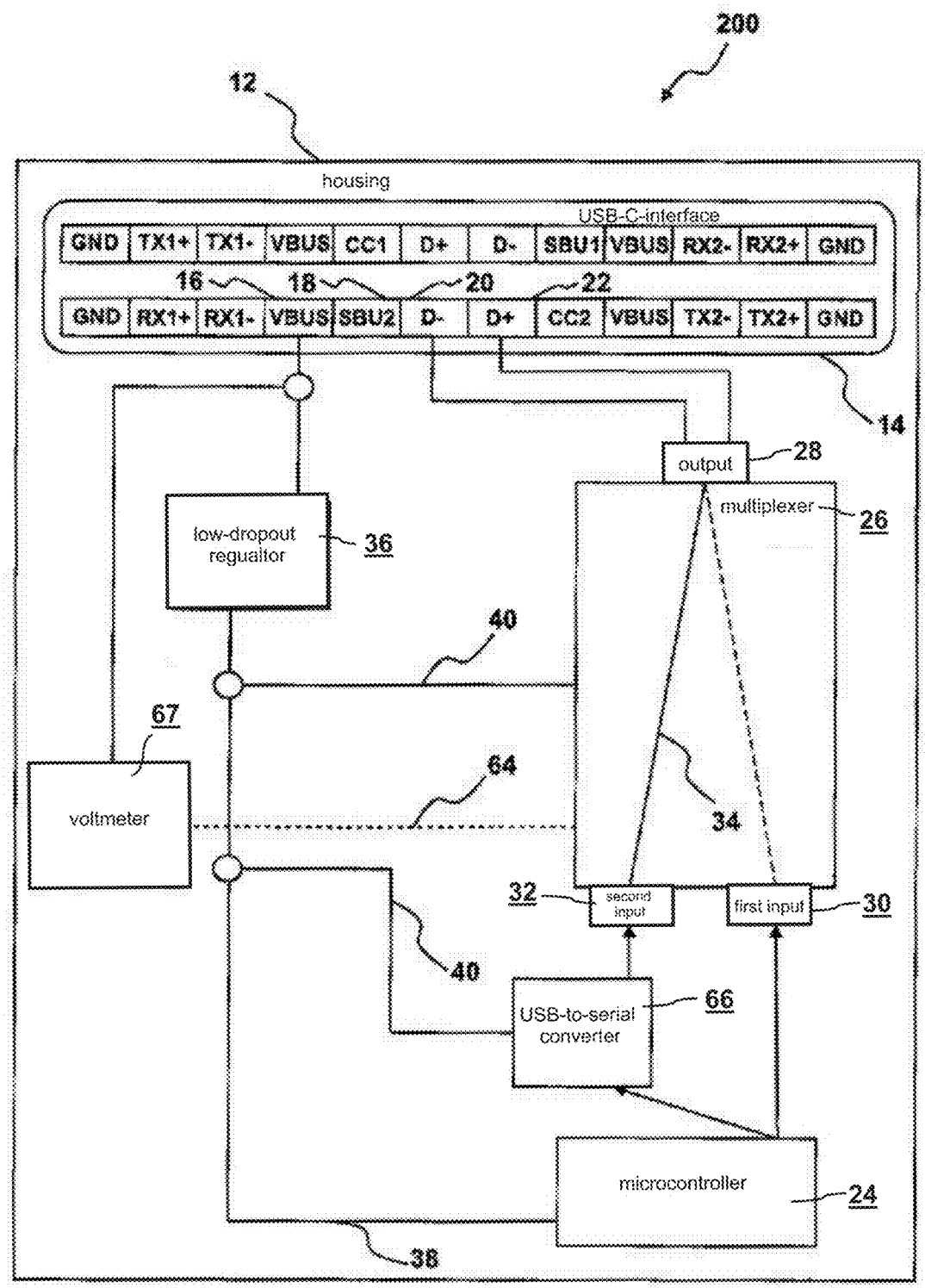
Figure 7:
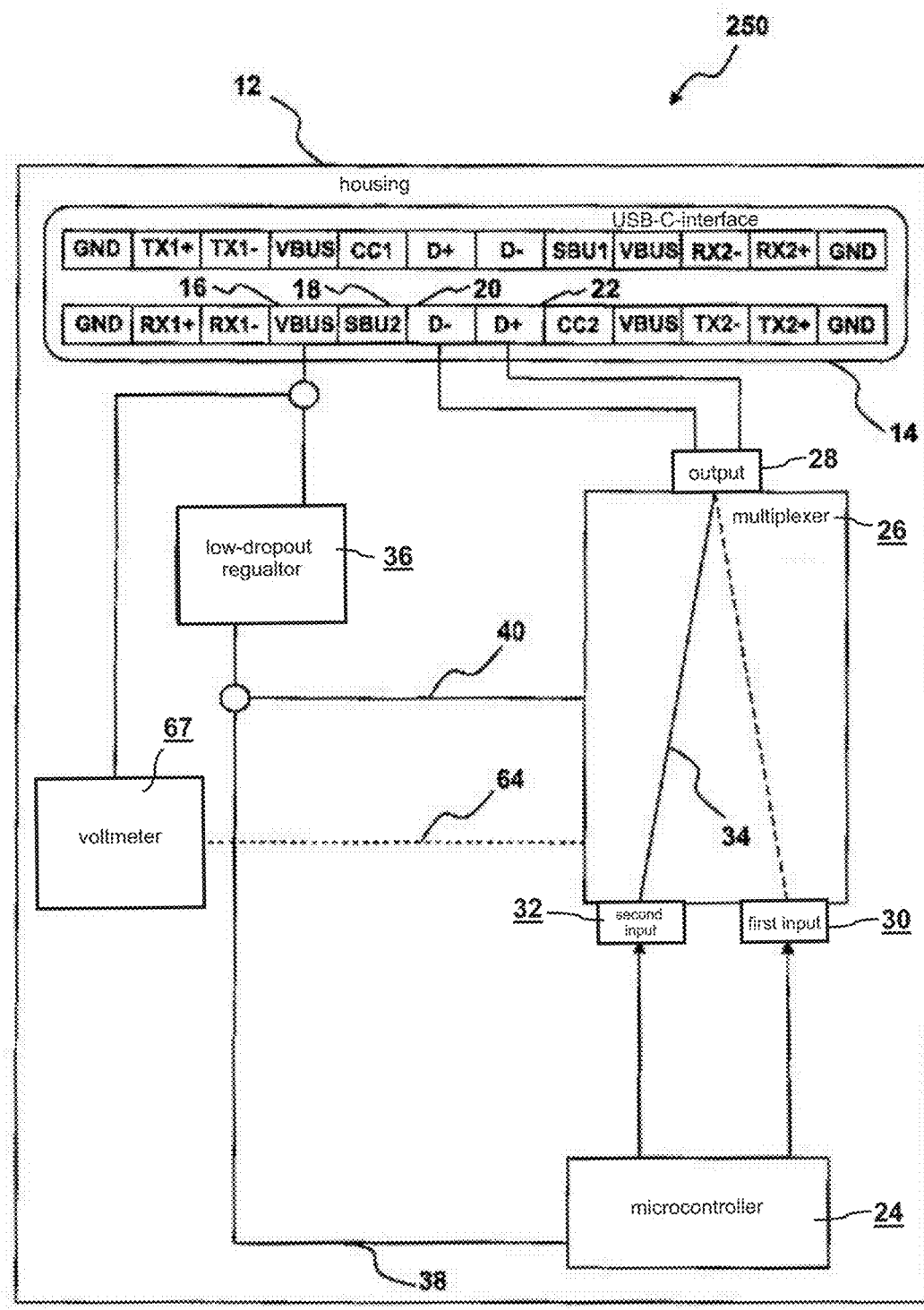
Figure 8:
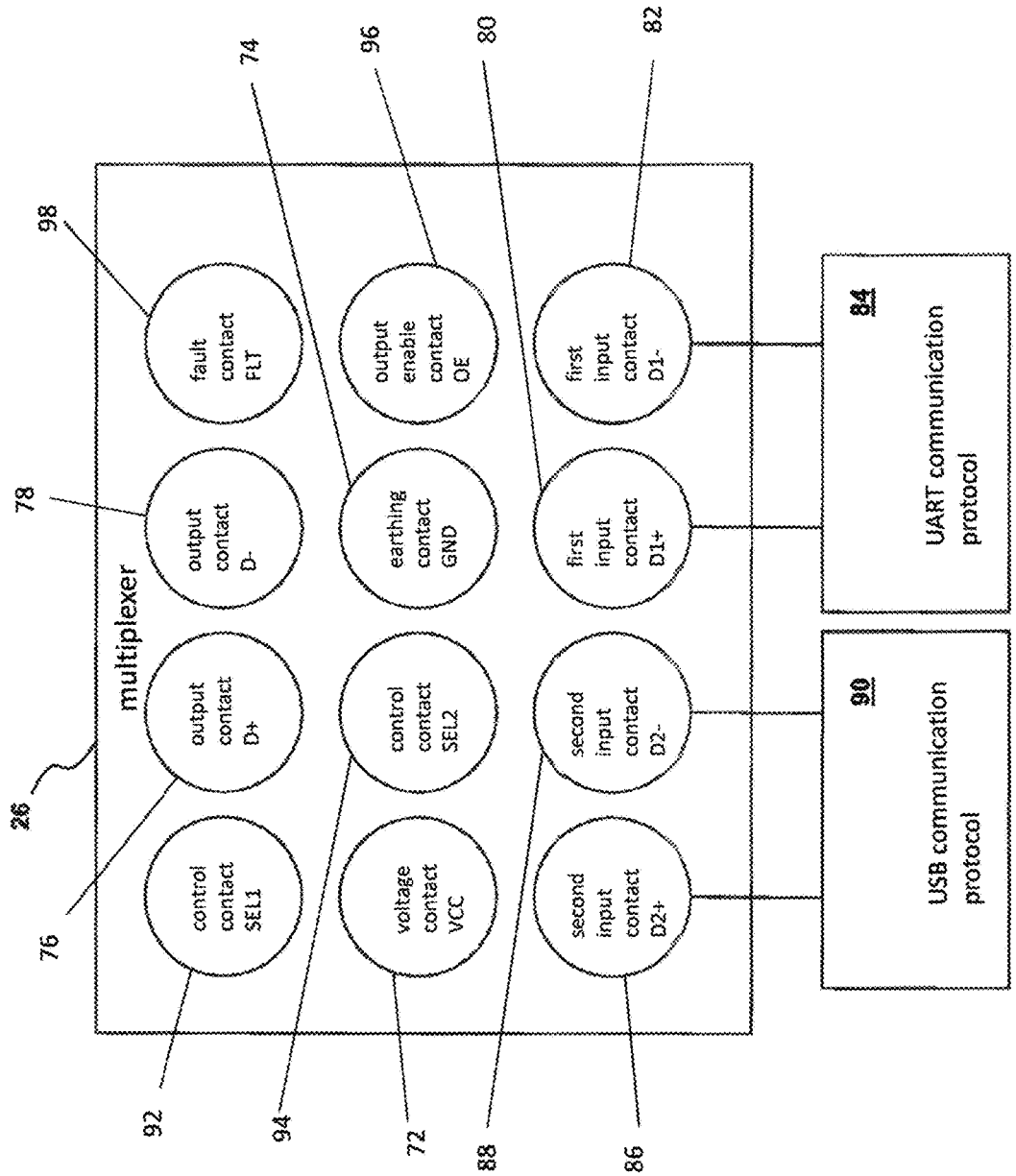

The invention and further advantageous embodiments and refinements thereof are described and explained in more detail below using the examples shown in the drawings. The features that can be inferred from the description and the drawings may be applied individually per se or together in any desired combination according to the invention. In the figures:

FIG. 1 shows a depiction of the measuring probe according to the invention with its options for connection to other means of communication, FIG. 2 shows a simplified schematic depiction of the measuring probe according to an embodiment, FIG. 3 shows a simplified schematic depiction of the measuring probe according to a further embodiment, FIG. 4 shows a simplified schematic depiction of the measuring probe according to a further embodiment, FIG. 5 shows a simplified schematic depiction of the measuring probe according to a further embodiment, FIG. 6 shows a simplified schematic depiction of the measuring probe according to a further embodiment, FIG. 7 shows a simplified schematic depiction of the measuring probe according to a further embodiment, and FIG. 8 shows a simplified schematic depiction of the multiplexer.

FIG. 1 shows a measuring probe 10 in schematically simplified form.

This measuring probe 10 comprises a measuring head 11 which is adapted to various applications and tasks of the measuring probe 10. Provided opposite the measuring head 11 on a housing 12 of the measuring probe 10 is a circuit 13 which is connected to a communications interface 14. This communications interface 14 (socket) is preferably configured as a USB-C interface and is described as such below, but this communications interface 14 is not limited thereto and may likewise comprise other types.

This communications interface 14 serves, for example, for connection to a cable 3 with a complementary communications interface 15 which is connected to a data processing device 4. This data processing device 4 may be in the form of a desktop computer, a terminal or a laptop, but also a mobile data processing device such as, for example, a tablet, a mobile phone or the like.

The measuring probe 10 may also be connected via the communications interface 14 to a further cable 3 which, for example, leads to a mobile handheld measuring device 5 which is provided to evaluate the data detected by the measuring probe 10 and, for example, to show them on a display 6.

It is also possible for there to be connected to the communications interface 14 of the measuring probe 10 an adapter 7 with a complementary communications interface 15 which processes the data detected by the measuring probe 10 and, for example, transmits them wirelessly to a further data processing device 4, 5. Known techniques for wireless data transmission such as, for example, Bluetooth or the like, may be used here. Such an adapter 7 may also have a battery which, in particular, is rechargeable and preferably supplies the measuring probe 10 with power.

It is also possible for an industrial interface 8 with a complementary interface to be connected to the communication interface 14 of the measuring probe 10. These industrial interfaces 8 have, for example, UART adapters or RS485 adapters.

The circuit 13 and the communications interface 14 are shown schematically in FIG. 2.

The communications interface 14, which is designated below as the USB-C interface 14, comprises 24 contacts in the known manner. As soon as the communication with an external device 4, 5, 7 is set up by means of the USB-C interface 14 in accordance with the UART or USB communication protocol, the 24 contacts can be used in the usual way. In the present case, however, four contacts, in particular, which are of primary importance in determining the communication protocol to be used and in the use of the measuring probe 10 are looked at.

These are a first voltage contact (VBUS) 16, a second voltage contact (SUB2) 18, a first data contact (D−) 20 and a second data contact (D+) 22.

The circuit 13 of the measuring probe 10 also comprises a microcontroller 24, a multiplexer 26, a low-dropout regulator 36 and a USB-to-serial converter 66.

The first voltage contact 16 is coupled to the low-dropout regulator 36. In accordance with a parallel circuit 42, the first voltage contact 16 is also coupled to the USB-to-serial converter 66 using the connection line 46. The second voltage contact 18 is likewise coupled to the low-dropout regulator 36. An output of the low-dropout regulator 36 is coupled to the microcontroller 24 and the multiplexer 26 using the supply lines 38, 40.

According to the present embodiment, a supply voltage is provided at the second voltage contact 18 by the device connected externally to the USB-C interface 14. The supply voltage typically has a voltage amplitude of 3.3 V. In order to offset or at least reduce distortions of the signal of the supply voltage which may result from the externally connected device, the supply voltage is smoothed by the low-dropout regulator 36. The supply voltage is then provided for supplying voltage to the microcontroller 24 and the multiplexer 26. This enables the smooth functioning of these components.

The multiplexer 26 comprises an output 28, a first input 30 and a second input 32. The output 28 of the multiplexer 26 is coupled to the first data contact 20 and the second data contact 22. The multiplexer 26 is set up, as a function of at least one control signal 44, to couple either the first input 30 or the second input 32 to the output 28 by means of a switching line 34 in order to enable data transmission by means of the UART communication protocol (first communication protocol) or the USB communication protocol (second communication protocol).

The microcontroller 24 is coupled to the first input 30 of the multiplexer 26 and, via the USB-to-serial converter 66, to the second input 32. According to the present embodiment, the microcontroller 24 is set up to provide data only in accordance with the UART communication protocol. In the basic setting of the multiplexer 26, the first input 30 is coupled to the output 28. This means that, in the basic setting, communication based on the UART communication protocol starting from the microcontroller 24 is possible.

As a function of the voltage amplitude present at the first voltage contact 16 which is provided by the externally connected device, the status of the multiplexer 26 can be changed by the control signal 44 in order to enable communication in accordance with the USB communication protocol. For this purpose, it is checked whether the voltage amplitude present at the first voltage contact 16 has exceeded a threshold. The threshold is typically at 4.5 V. The reason for this is that an externally connected device which is operated according to the UART communication protocol usually only provides voltages in the range from 3.5 V to 4.2 V. On the contrary, in devices which are operated according to the USB communication protocol, voltage amplitudes are in the range from 4.5 V to 5.1 V.

The voltage amplitude present at the first voltage contact 16 can be checked using a voltmeter (not shown here). Alternatively, it could also be checked by the low-dropout regulator 36 if the latter is multipolar. Furthermore, the circuit could also be set up so that the USB-to-serial converter 66 and the multiplexer 26 always have applied to them the voltage present at the first voltage contact 16 and their functioning only changes if the threshold is exceeded. In the latter case, the control signal 44 is provided for this purpose by the multiplexer 26 itself.

In any case, the data of the measuring probe 10 are provided in accordance with the UART communication protocol from the microcontroller 24 for the USB-to-serial converter 66. The USB-to-serial converter 66 converts the data and provides them at the second input 32 of the multiplexer 26 so that they are no longer present there in accordance with the UART communication protocol, but in accordance with the USB communication protocol. Since the switching line 34 of the multiplexer 26 is switched from the first input 30 to the second input 32 as a function of the control signal 44, the communication therefore becomes possible in accordance with the USB communication protocol as soon as the threshold is exceeded. If the voltage amplitude present at the first voltage contact 16 falls back below the threshold, the output state of the multiplexer 26 changes so that the first input 30 is coupled to the output 28 in accordance with the UART communication protocol.

FIG. 3 shows a simplified schematic depiction of the circuit 13 with the communications interface 14 of the measuring probe 50 according to a further embodiment. According to the figure described above, the same components are given the same names. These components are not described in detail. Only the differences from FIG. 2 are looked at here.

According to the present embodiment of the measuring probe 50, the USB-to-serial converter is dispensed with. Its functionality is taken over by the microcontroller 24. In the present case, the microcontroller 24 has a voltmeter 52. Generally speaking, the voltmeter 52 could also be external to the microcontroller 24 and merely be coupled to it. The voltage present at the first voltage contact 16 is fed to the voltmeter 52 using the connection line 48. Using the voltmeter 52, the microcontroller 24 is set up to determine whether the voltage amplitude exceeds the threshold. According to this embodiment, the microcontroller 24 is not only set up to provide data in accordance with the UART communication protocol for the first input 30 of the multiplexer 26, but also in accordance with the USB communication protocol for the second input 32. The microcontroller 24 is set up not only to decide, on the basis of the detected voltage amplitude, which communication standard is to be used to provide the data for the multiplexer 26 and the input at which these data have to be provided, but also provides the corresponding control signal 44 for the multiplexer 26. The multiplexer 26 for the data transmission is correspondingly configured based on the control signal 44. Also according to the present embodiment, the multiplexer 26 has a basic setting which is varied only if the threshold is exceeded.

FIG. 4 shows a simplified schematic depiction of the circuit 13 with the communications interface 14 of the measuring probe 100 according to a further embodiment. According to the figures described above, the same components are given the same names. These components are not described in detail. Only the differences from the above figures are looked at here.

The embodiment of the circuit 13 of the measuring probe 100 substantially corresponds to the embodiment of the circuit 13 of the measuring probe 10. However, a simplification is made. The voltage amplitude present at the first voltage contact 16 is not only used to determine the communication standard to be used, but also to supply voltage to the components of the measuring probe 100.

The measuring probe 100 has a voltage divider 54. The voltage divider 54 has at least two resistors 56, 58 connected in series and a centre tap 60 arranged in between them. The centre tap 60 is coupled to the voltmeter 52 of the microcontroller 24 using the connection line 62. In order to enable the communication standard to be determined and the supply voltage to be provided at the same time, the low-dropout regulator 36 and the voltage divider 54 are arranged in a parallel circuit with respect to the first voltage contact 16. The voltage divider 54 then provides a test voltage for the voltmeter 52 via the centre tap 60. The test voltage is directly proportional to the voltage amplitude present at the first voltage contact 16. The proportionality results from the relative sizes of the resistors 56, 58. The test voltage is usually lower than the voltage present at the first voltage contact 16. Consequently, the voltmeter 52 only needs to be configured for a low voltage range.

The low-dropout regulator 36 smooths the voltage amplitude fed to it and provides it as a supply voltage 38, 40 for the components of the measuring probe 100. According to this embodiment, the second voltage contact 18 is irrelevant and unnecessary here.

On the basis of the voltage amplitude determined by the voltmeter 52 relative to the prescribed threshold, if a voltage of 4.5 V or more is present, a control signal 64 for the USB-to-serial converter 66 and for the multiplexer 26 is provided by the microcontroller 24 and configures this accordingly. In a known way, the data (measurement data of a sensor arrangement of the measuring probe 100), instead of being provided from the microcontroller 24 at the first input 30 of the multiplexer 26 via the UART communication protocol, are provided at the second input 32 of the multiplexer 26 by the USB communication protocol through the USB-to-serial converter 66. The latter taking place after the USB-to-serial converter 66 has first received the data from the microcontroller 24 in accordance with the UART communication protocol and converted them.

In addition, the microcontroller 24 is also set up to provide a control signal for the USB-to-serial converter 66 in order to trigger the conversion and corresponding provision of the data at the second input 32 by it.

FIG. 5 shows a simplified schematic depiction of the circuit 13 with the communications interface 14 of the measuring probe 150 according to a further embodiment. According to the figures described above, the same components are given the same names. These components are not described in detail. Only the differences from the above figures are looked at here.

The embodiment of the measuring probe 150 substantially corresponds to the embodiment of the measuring probe 50. However, the simplification already described in relation to the measuring probe 100 is made again. The voltage amplitude present at the first voltage contact 16 is not only used to determine the communication standard to be used, but also to supply voltage to the components of the measuring probe 150.

According to this embodiment, the USB-to-serial converter is dispensed with. For this purpose, the microcontroller 24 is set up to provide the data in accordance with both communication protocols either at the first input 30 or at the second input 32 of the multiplexer 26. The measuring probe 150 likewise comprises a voltage divider 54 which is arranged in a parallel circuit with the low-dropout regulator 36. Using the centre tap 60, the voltage divider 54 provides a test voltage for the voltmeter 52 of the microcontroller 24. If a threshold of 4.5 V is exceeded, a control signal 64 is output from the microcontroller 24 for the multiplexer 26 and actuates the USB communication protocol. As already described above, the supply voltage 38, 40 of the microcontroller 24 and of the multiplexer 26 is provided by the low-dropout regulator 36.

FIG. 6 shows a simplified schematic depiction of the circuit 13 with the communications interface 14 of the measuring probe 200 according to a further embodiment. According to the figures described above, the same components are given the same names and reference is made to this description. The differences from FIGS. 1 to 5 above are looked at below.

A voltage sensor 67 is provided separately from the microcontroller 24. The voltmeter 67 is coupled to the first voltage contact (VBUS) 16. The voltmeter 67 may be arranged with the low-dropout regulator 36 in a parallel circuit with respect to the first voltage contact 16. The first voltage contact 16 is evaluated by the voltmeter 67 in respect of the voltage amplitude present, for example by means of a comparator. As a function of the voltage amplitude present, the multiplexer 26 is configured by the voltmeter 67 with the control signal 64 in accordance with the first or second communication protocol. At the same time, the supply voltage for the components of the circuit 13 is also provided by the first voltage contact 16, that is to say for the low-dropout regulator 36, the multiplexer 26, the USB-to-serial converter 66 and the microcontroller 24.

FIG. 7 shows a simplified schematic depiction of the circuit 13 with the communications interface 14 of the measuring probe 250 according to a further embodiment. According to the figures described above, the same components are given the same names and reference is made to this description. The differences from FIGS. 1 to 6 above are looked at below.

FIG. 7 substantially corresponds to FIG. 6, but the microcontroller 24 is set up to provide the data both in accordance with the USB communication protocol and according to the UART communication protocol. Nevertheless, the single first voltage contact (VBUS) 16 is also used here to provide the supply voltage of the circuit 13 and to provide the information on the communication protocol to be used at the same time. The voltmeter 67 configures the multiplexer 26 in a corresponding way, for example as a function of the threshold conditions outlined above.

FIG. 8 shows a simplified schematic depiction of the multiplexer 26. The multiplexer 26 substantially has twelve contacts. The contacts D+, D− 76, 78 represent the output of the multiplexer 2. The first input is formed by the contacts D1+, D1− 80, 82. The second input is formed by the contacts D2+, D2− 86, 88. The contacts of the first input 80, 82 are coupled in accordance with the UART communication protocol 84. The contacts of the second input 86, 88 are coupled in accordance with the USB communication protocol 90. The supply voltage is present at the voltage contact VCC 72 as against the earthing contact GND 74. The output enable contact OE 96 can optionally be addressed and can determine whether or not the output is enabled. Based on the two control contacts SEL1, SEL2, 92, 94, it is determined whether the contacts of the first input 80, 82 or the contacts of the second input 86, 88 are coupled to the contacts of the output 76, 78. In the basic setting of the multiplexer 26, the contacts 80, 82 of the first input are coupled to the contacts 76, 78 of the output. In this respect, there always needs to be a control signal at the control contacts SEL1, SEL2, 92, 94 in order to change the configuration of the multiplexer 26. This can take place on the basis of corresponding logical high/low signals which are applied to the control contacts SEL1, SEL2, 92, 94. For example, the multiplexer 26 may be configured in accordance with the UART communication protocol if there is a logical low at both control contacts SEL1, SEL2, 92, 94 and in accordance with the USB communication protocol if there is a logical high at both control contacts SEL1, SEL2, 92, 94. The control signal may be provided in the way described, for example by the microcontroller 24 or the voltmeter 67. A fault contact FLT 98 is also provided.

The invention claimed is:

1. Measuring probe comprising a housing and a measuring head accommodated in the housing, wherein at least one communications interface is provided on the housing and communicates with a circuit arranged in the housing, the circuit comprising at least one microcontroller and at least one multiplexer, wherein data are transmittable by the circuit by means of at least two different communication protocols by way of a common communications interface, wherein the communications interface is a USB-C interface, characterized in that the communications interface comprises at least one first voltage contact and at least two data contacts, wherein the multiplexer is coupled to the communications interface and the microcontroller, wherein the multiplexer is configured as a function of a first voltage amplitude present at the at least one first voltage contact in accordance with at least one first communication protocol or one second communication protocol, so that data are transmittable by means of the at least two data contacts using the configured communication protocol from the microcontroller to an external device which can be connected via the communications interface, and wherein at least one USB-to-serial converter is provided, wherein the multiplexer is configured in accordance with at least the first and the second communication protocol either on the basis of the microcontroller alone or on the basis of the microcontroller and the USB-to-serial converter.

2. Measuring probe according to claim 1, wherein a low-dropout regulator is provided, wherein the low-dropout regulator is coupled to the communications interface, and wherein the low-dropout regulator is arranged and set up to smooth an input voltage received from the communications interface and to provide an output voltage as a supply voltage for the microcontroller and/or the multiplexer.

3. Measuring probe according to claim 2, wherein the input voltage of the low-dropout regulator is based on the voltage present at the first voltage contact of the communications interface.

4. Measuring probe according to claim 1, wherein the microcontroller comprises at least one voltmeter or is coupled to such a voltmeter so that a value of the first voltage amplitude present at the at least first voltage contact can be determined.

5. Measuring probe according to claim 4, wherein a voltage divider is provided, wherein an input of the voltage divider is electrically coupled to the at least first voltage contact, and in that the voltmeter has applied to it a voltage output by the voltage divider.

6. Measuring probe according to claim 1, wherein the multiplexer is configured in accordance with the first communication protocol provided the voltage amplitude present at the first voltage contact does not exceed a first predetermined threshold, and wherein the multiplexer is otherwise configured in accordance with the second communication protocol.

7. Measuring probe according to claim 1, wherein the voltage amplitude present at the at least first voltage contact is provided by the external device which is connectable to the measuring probe.

8. Measuring probe according to claim 1, wherein the circuit is configured such that a supply voltage is provided for the circuit in the housing exclusively via the first voltage contact.

9. Measuring probe according to claim 1, wherein the multiplexer is configured exclusively as a function of a voltage amplitude present at the first voltage contact.

10. Measuring probe according to Claim 1, wherein the microcontroller comprises at least one voltmeter or is coupled to such a voltmeter so that a value of the first voltage amplitude present at the at least first voltage contact can be determined and wherein the voltmeter and the low-dropout regulator are arranged in a parallel circuit with respect to the first voltage contact.

11. Measuring probe according to claim 1, wherein the first voltage contact is a VBUS1 contact.

12. Measuring probe according to claim 1, wherein the first communication protocol is a UART communication protocol and the second communication protocol is a USB communication protocol.

13. Measuring probe according to claim 1, wherein the measuring probe comprises a sensor arrangement for measuring layer thicknesses of corrosion protection for material testing or for surface testing, wherein measurement data of the sensor arrangement are communicated to an external device using at least the first communication protocol or the second communication protocol.

14. Measuring probe according to claim 1, wherein the first communication protocol is actuated if a voltage present at the communications interface and provided by an external device is less than 4.3 V, and provision is made for a switch to the second communication protocol, if a voltage provided is more than 4.3 V.

15. Measuring probe according to claim 14, wherein the second communication protocol is a USB communication protocol.

16. Measuring probe according to claim 1, wherein the measuring probe is for tactile measurement on a surface of objects.

17. Measuring probe according to Claim 1, wherein the circuit is configured such that a supply voltage is provided for the circuit in the housing exclusively via the first voltage contact from the external device.

* * * * *